United States Patent [19]

Unger

[11] Patent Number: 4,652,076

[45] Date of Patent: Mar. 24, 1987

[54] SYMMETRICAL WAVEGUIDE COUPLER

[75] Inventor: Hans-Georg Unger, Brunswick, Fed. Rep. of Germany

[73] Assignee: ANT Nachrichtentechnik GmbH, Backnang, Fed. Rep. of Germany

[21] Appl. No.: 623,432

[22] Filed: Jun. 22, 1984

[30] Foreign Application Priority Data

Jun. 25, 1983 [EP] European Pat. Off. ......... 83106227.8

[51] Int. Cl.$^4$ ................................. G02B 6/28
[52] U.S. Cl. ...................... 350/96.12; 350/96.13
[58] Field of Search ............... 350/96.12, 96.13, 96.14, 350/96.15

[56] References Cited

U.S. PATENT DOCUMENTS

| | | | |
|---|---|---|---|
| 3,589,794 | 6/1971 | Marcatili | 350/96.12 |
| 3,920,314 | 11/1975 | Yajima | 350/96.12 |
| 3,957,341 | 5/1976 | Taylor | 350/96.15 |
| 4,153,328 | 5/1979 | Wang | 350/96.15 |
| 4,461,535 | 7/1984 | Marcatili | 350/96.12 |
| 4,483,582 | 11/1984 | Sheem | 350/96.12 |
| 4,483,583 | 11/1984 | Unger | 350/96.12 |

FOREIGN PATENT DOCUMENTS 2501383 3/1982 France .
2096790A 3/1962 United Kingdom .

*Primary Examiner*—William L. Sikes
*Assistant Examiner*—Akm E. Ullah
*Attorney, Agent, or Firm*—Spencer & Frank

[57] ABSTRACT

A symmetrical waveguide coupler having two signal channels for coupling a first signal having a wavelength $\lambda_1$ and a second signal having a wavelength $\lambda_2$ which is longer than $\lambda_1$. The coupler includes a carrier substrate and first and second dielectric strips embedded in the substrate to form two identical dielectric waveguides which together with the substrate define a coupling region. The first waveguide has first and second arms connected to the coupling region and the second waveguide has a third arm connected to the coupling region. The second and third arms are oriented in a direction facing away from the first arm. The dielectric strips are so dimensioned and arranged within the substrate as to present an effective coupling length $c_1 L_1$ equal to $\pi/2$ at a wavelength of $\lambda_1$ for coupling the first signal between the first and third arms and an effective coupling length $c_1 L_1$ equal to $\pi$ at a wavelength of $\lambda_2$ for coupling the second signal between the first and second arms, with $c_1$ being the coupling coefficient between the fundamental modes of the signals in the strips and a function of wavelength, and $L_1$ being the length of the coupling region.

6 Claims, 3 Drawing Figures

SYMMETRICAL WAVEGUIDE COUPLER

BACKGROUND OF THE INVENTION

The present invention relates to a symmetrical waveguide coupler in which two identical waveguides are coupled together.

In optical communications systems operating with wavelength multiplex, optical signals of different wavelengths from separate sources must be combined in one waveguide for transmission. Likewise, in the receiver the signals must be separated again from one another. Full duplex operation using one optical waveguide for both directions also requires such multiplexers, but in this case they serve as transmit-receive duplexers.

Multiple utilization of a transmission medium with different carrier frequency signals in frequency multiplex is also applicable for microwaves, in which case multiplexers and demultiplexers or transmit-receive duplexers, respectively, are then required for the respective microwaves.

For single-mode fiber systems, the multiplexers and demultiplexers should be designed as simply as possible from planar waveguides so that they are suitable for integrated optical systems. For microwaves, particularly those of millimeter wavelength, dielectric waveguides or image guides are suitable for a planar structure.

SUMMARY OF THE INVENTION

It is an object of the present invention to provide a multiplexer or demultiplexer, respectively, for signals of different wavelengths which is of simple design for the above-described applications.

The above and other objects are accomplished in accordance with the invention wherein a symmetrical waveguide coupler is provided having two signal channels for coupling a first signal having a wavelength $\lambda_1$ and a second signal having a wavelength $\lambda_2$ which is longer than $\lambda_1$. The coupler includes a carrier substrate and first and second dielectric strips embedded in the substrate to form two identical dielectric waveguides which together with the substrate define a coupling region. The first waveguide has first and second arms connected to the coupling region and the second waveguide has a third arm connected to the coupling region. The second and third arms are oriented in a direction facing away from the first arm. The dielectric strips are so dimensioned and arranged within the substrate as to present an effective coupling length $c_1 L_1$ equal to $\pi/2$ at a wavelength of $\lambda_1$ for coupling the first signal between the first and third arms and an effective coupling length $c_1 L_1$ equal to $\pi$ at a wavelength of $\lambda_2$ for coupling the second signal between the first and second arms, with $c_1$ being the coupling coefficient between the fundamental modes of the signals in the strips and a function of wavelength, and $L_1$ being the length of the coupling region.

DESCRIPTION OF THE PREFERRED EMBODIMENTS

Figure 1:
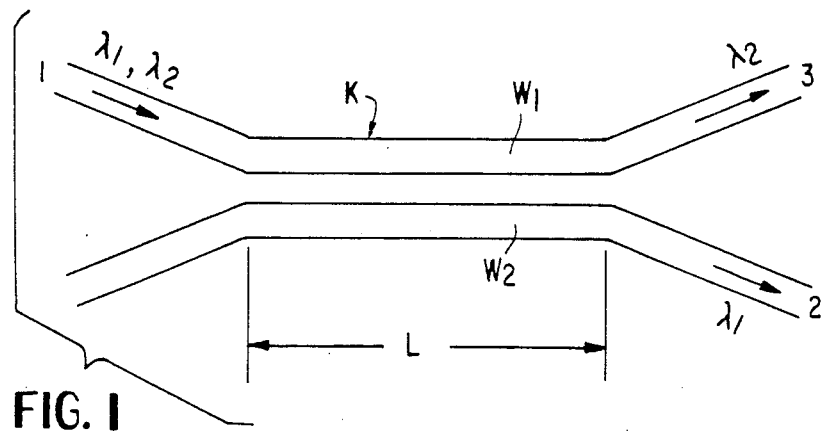
FIG. 1 is a pictorial view of a symmetrical dielectric waveguide coupler according to the invention.

FIG. 1 shows a symmetrical waveguide coupler K in accordance with the invention. It comprises two identical waveguides $W_1$, $W_2$, which are coupled together over the length L. Two signals having wavelengths $\lambda_1$ and $\lambda_2$, respectively, are fed to the arrangement at input arm 1. Only the signal of wavelength $\lambda_2$ is coupled out at arm 3 of the coupler and only the signal of wavelength $\lambda_1$ can be obtaioned at arm 2.

Figure 2:
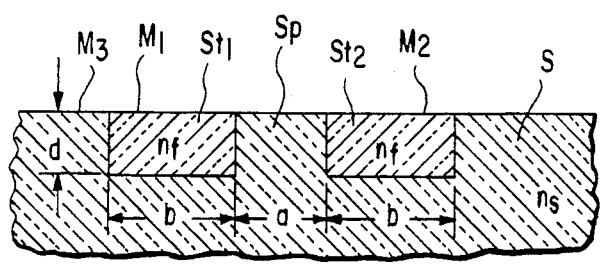
FIG. 2 is a sectional view of the symmetrical dielectric waveguide coupler of FIG. 1 in the region of the coupling length L.

FIG. 2 is a sectional view of the coupler of FIG. 1. According to the present invention, the coupler is constructed of dielectric waveguides designed as planar waveguides. This is realized in that two dielectric strips $St_1$ and $St_2$ are inserted at a spacing a into a carrier substrate S which has an index of refraction $n_s$. The index of refraction of the dielectric strips is $n_f$. The width of the two strips is marked b and their thickness is marked d. In the illustrated embodiment of FIG. 2, the dielectric strips $St_1$ and $St_2$ are completely embedded in the substrate S save for continuous, planar surfaces $M_1$ and $M_2$ which are coplanar with the surface $M_3$ of substrate S. Waveguides $W_1$ and $W_2$ are identical in composition and dimensions and, as can be seen in FIG. 1, are symmetrically disposed in substrate S.

Substrate S includes a region Sp between spaced strips $St_1$ and $St_2$ which constitutes an "interaction gap." The coupling coefficient c between the fundamental modes in the two strips $St_1$ and $St_2$ is approximately $$c \approx \frac{2V\sqrt{B}\,(1-B)\exp(-V\sqrt{B}\,a/b)}{\beta\,b^2[1 + 1/(V\sqrt{B}\,)]} \tag{1}$$

In Equation (1), $V=(2\pi b/\lambda)\sqrt{n_f^2-n_s^2}$, which represents the waveguide parameter of the strip conductors, $\beta$ represents the phase constant of a coupled signal at its wavelength $\lambda$ and $$B=[(\beta\lambda)^2/(2\pi)^2 - n_s^2]/(n_f^2 - n_s^2)$$

which represents the phase parameter of a coupled signal. The approximation for the coupling coefficient c indicates that the function $\exp(-V\sqrt{B}\,a/b)$ is the dominating factor for the coupling coefficient c. Because $V \sim 1/\lambda$ and since the decrease of $B\beta\lambda$ and consequentially also of B with increasing $\lambda$ is far weaker in the wavelength range of practical importance, the exponent $(-V\sqrt{B}\,a/b)$ decreases in absolute value with increasing wavelength nearly proportional to $1/\lambda$. Further because the exponent decreases in its absolute value with increasing $\lambda$, the exponential function increases considerably so that the coupling coefficient c also grows to a corresponding degree, i.e. its relative change at a given wavelength $\lambda$, such change being mathematically expressed as $$\frac{\lambda}{c}\frac{dc}{d\lambda} \sim V\sqrt{B}\,\frac{a}{b} \tag{2}$$

is the greater, the greater the exponent $V\sqrt{B}\,a/b$. Since V and B are fixed in their order of magnitude if the system operates in a single-mode range, the relative change of the coupling coefficient c at the given wavelength λ can be set by adjusting the ratio of the widths a/b.

The power of an input signal fed into input arm 1 of the coupler is completely coupled over to the other strip and appears at output arm 2 if the effective coupling length at the wavelength of that input signal is $$cL = (m + 1/2)\pi, \text{ where } m = 0, 1, 2 \ldots, \quad (3)$$

i.e., cL equals an odd multiple of $\pi/2$. However, the power of an input signal remains in the input waveguide or is completely coupled back to it, respectively, and appears at output arm 3 if at the wavelength of that input signal $$cL = m\pi \quad (4)$$

i.e., cL equals a whole number multiple of $\pi$. Otherwise, the output power of each signal at the respective arms 2 and 3 is a sinusoidal function of cL with the power of a signal at one output arm being offset in its sinusoidal dependence on cL by $\pi/2$ with respect to the power of that signal at the other output arm.

To separate signals of the two wavelengths $\lambda_1$ and $\lambda_2 = \lambda_1 + \Delta\lambda$ from one another, the coupling coefficient and the length of the coupler are dimensioned in such a manner that $$c(\lambda_1)L = \pi/2 \quad (5)$$

and $$c(\lambda_2)L = \pi. \quad (6)$$

Due to the reciprocity of the arrangement, the coupler operates as a multiplexer in the reverse direction instead of demultiplexer. As a multiplexer, the coupler can bring together two optical signals at two different wavelengths $\lambda_1$ and $\lambda_2$. For this purpose a signal at wavelength $\lambda_1$ is fed into arm 2 and a signal at wavelength $\lambda_2 = \lambda_1 + \Delta\lambda$ into arm 3.

The left arm of waveguide $W_2$ in FIG. 1 should be terminated so that any spurious signals which accidentily reach this arm are radiated into and absorbed by the substrate.

Figure 3:
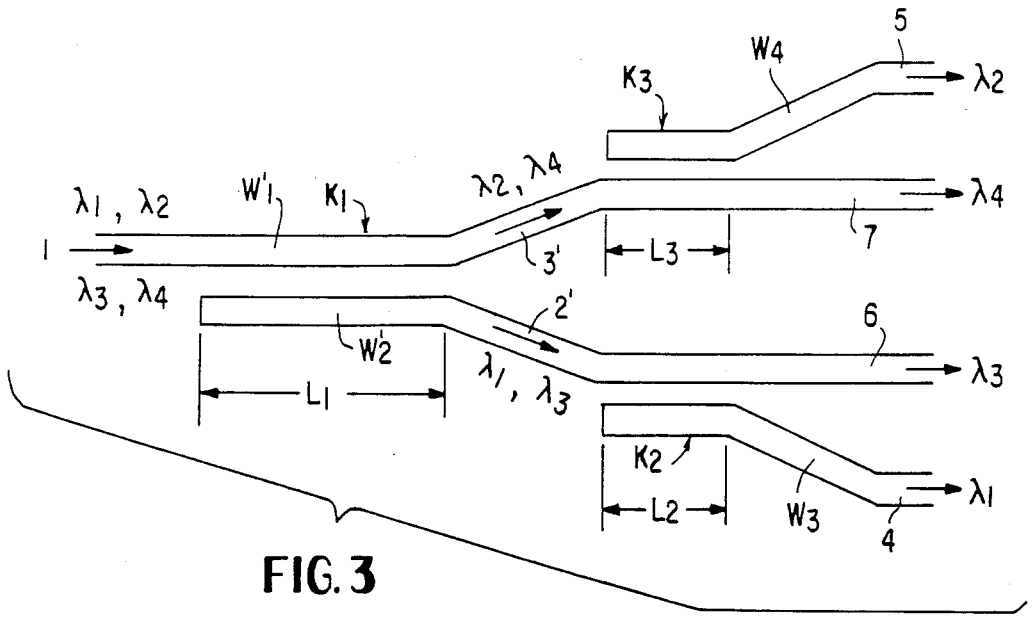
FIG. 3 is a pictorial view illustrating an arrangement of three symmetrical dielectric waveguide couplers according to the invention.

If four signals at different wavelengths $\lambda_1 < \lambda_2 < \lambda_3 < \lambda_4$ are to be separated from one another or brought together, a suitable demultiplexer or multiplexer, respectively, according to the present invention can be designed as shown in FIG. 3. Coupler $K_1$ in the first stage of this demultiplexer is dimensioned in such a way that its product of coupling coefficient $c_1$ and length $L_1$ at the different signal wavelengths meets the following conditions:

$$c_1(\lambda_1)L_1 = \frac{\pi}{2}, \quad (7)$$

$$c_1(\lambda_2)L_1 = \pi,$$

$$c_1(\lambda_3)L_1 = \frac{3\pi}{2},$$

$$c_1(\lambda_4)L_1 = 2\pi.$$

This causes the signals at wavelengths $\lambda_1$ and $\lambda_3$, respectively, to appear in the output arm $2'$ of the coupled-in waveguide $W_2'$ of the first stage of the coupler, while the signals at wavelengths $\lambda_2$ and $\lambda_4$, respectively, in the continuous waveguide $W_1'$ appear at output arm $3'$. Couplers $K_2$ and $K_3$ of the second stage, which are connected to coupler $K_1$, are themselves dimensioned in such a manner that their respective products of coupling coefficients $c_2$ and $c_3$, respectively, and lengths $L_2$ and $L_3$, respectively, meet the following conditions:

$$c_2(\lambda_1)L_2 = \frac{\pi}{2}, \quad (8)$$

$$c_2(\lambda_3)L_2 = \pi,$$

$$c_3(\lambda_2)L_3 = \frac{\pi}{2},$$

$$c_3(\lambda_4)L_3 = \pi.$$

Under these conditions, the four different signals fed in at input arm 1 appear at their different wavelengths at the four different output arms 4, 5, 6 and 7, as shown in FIG. 3. Due to the reciprocity of the arrangement shown in FIG. 3, it can conversely also act as a multiplexer so as to combine the signals at the four different wavelengths in one waveguide.

The left arm of waveguide $W_2'$ in FIG. 3 as well as the left arms of waveguides $W_4$ and $W_3$ in this Figure are terminated into the substrate so that any spurious signals which accidentally reach these arms are radiated and absorbed by the substrate.

As a specific example for an embodiment of the invention two dielectric strip waveguides of width b=3 $\mu$m and thickness d=2 $\mu$m and refractive index $n_f$=1.512 are formed by ion exchange or implantation in a glass substrate of refractive index $n_s$=1.5. Their waveguide parameter and phase parameter for the fundamental mode at $\lambda$=1.2 $\mu$m are nearly V=3 and B=0.5 respectively. When both waveguides are spaced one from another at a distance of a=4 $\mu$m the coupling coefficient according to equation (1) is nearly c=1.2/mm. To satisfy eq.(5) for $\lambda$=1.2 $\mu$m requires the length of the coupler L=1.3 mm and the optical signal which the demultiplexer according to FIG. 1 separates from the signal at $\lambda_1$ must according to eq.(6) have a wavelength of $\lambda_2$=1.59 $\mu$m.

When both waveguides are spaced at a distance of a=6 $\mu$m the coupling coefficient according to eq.(1) is nearly c=0.29/mm. To satisfy the first of eqs.(7) for $\lambda_1$=1.2 $\mu$m requires $L_1$=5.4 mm. The second of eqs.(7) is then satisfied at $\lambda_2$=1.44 $\mu$m, the third at $\lambda_3$=1.62, and the fourth at $\lambda_4$=1.78. Such a symmetrical waveguide coupler can therefore serve as the first demultiplexer stage $K_1$ of FIG. 3 to channel optical signals at $\lambda_1$ and $\lambda_3$ into arm $W_2'$ and optical signals at $\lambda_2$ and $\lambda_4$ into arm $W_3$. It is quite obvious from the above example for FIG. 1, how the symmetrical couplers $K_2$ and $K_3$ must be dimensioned to separate $\lambda_1$ from $\lambda_3$ and $\lambda_2$ from $\lambda_4$ respectively.

It will be understood that the above description of the present invention is susceptible to various modifications, changes and adaptations, and the same are intended to be comprehended within the meaning and range of equivalents of the appended claims.

What is claimed is:

1. A symmetrical waveguide coupler having two signal channels for coupling a first signal having a wavelength $\lambda_1$ and a second signal having a wavelength $\lambda_2$ which is longer than $\lambda_1$ comprising:
   a carrier substrate; and
   first and second dielectric strips embedded in said substrate to form first and second identical dielectric waveguides which together with said substrate define a coupling region, said first waveguide having first and second arms connected to said coupling region and said second waveguide having a third arm connected to said coupling region, said second and third arms being oriented in a direction facing away from said first arm, wherein said dielectric strips are so dimensioned and arranged within said substrate as to present an effective coupling length $c_1L_1$ equal to $\pi/2$ at a wavelength of $\lambda_1$ for coupling the first signal between said first and third arms and an effective coupling length $c_1L_1$ equal to $\pi$ at a wavelength of $\lambda_2$ for coupling the second signal between said first and second arms, with $c_1$ being the coupling coefficient between the fundamental modes of the signals in said strips and a function of wavelength, and $L_1$ being the length of the coupling region.

2. The coupler of claim 1, wherein said dielectric strips and said substrate have coplanar surfaces.

3. The coupler of claim 1, wherein said waveguides are constructed for transmitting optical signals.

4. A waveguide arrangement having four channels for coupling first, second, third and fourth signals having respectively increasing wavelengths $\lambda_1$, $\lambda_2$, $\lambda_3$ and $\lambda_4$, comprising in combination:

a first symmetrical waveguide coupler as defined in claim 1 wherein said strips are additionally constructed and dimensioned to present an effective coupling length $c_1L_1$ equal to $2\pi$ at a wavelength of $\lambda_4$ and equal to $3\pi/2$ at a wavelength of $\lambda_3$ for coupling the signals having wavelengths $\lambda_1$ and $\lambda_3$ between said first and third arms and for coupling the signals having wavelengths $\lambda_2$ and $\lambda_4$ between said first and second arms;

a second symmetrical waveguide coupler connected to said first coupler via a first portion of said third arm, said second coupler including a third dielectric strip embedded in said substrate to form a third dielectric waveguide which together with a second portion of said third arm and said substrate defines a second coupling region, said third arm having a third portion which constitutes a fourth arm which is connected to said second coupling region and said third waveguide having a fifth arm connected to said second coupling region, wherein said third dielectric strip is so dimensioned and arranged in said substrate in relation to said third arm as to present an effective coupling length $c_2L_2$ equal to $\pi/2$ at a wavelength of $\pi_1$ for coupling the first signal between said third and fifth arms and equal to $\pi$ at a wavelength of $\lambda_3$ for coupling the third signal between said third and said fourth arms; and a third symmetrical waveguide coupler connected to said first coupler via a first portion of said second arm, said third coupler including a fourth dielectric strip embedded in said substrate to form a fourth waveguide which together with a second portion of said second arm and said substrate defines a third coupling region, said second arm having a third portion which constitutes a sixth arm which is connected to said third coupling region and said fourth waveguide having a seventh arm connected to said third coupling region, wherein said fourth dielectric strip is so dimensioned and arranged in said substrate in relation to said second arm as to present an effective coupling length $c_3L_3$ equal to $\pi/2$ to a wavelength of $\pi_2$ for coupling the second signal between said second and seventh arms and equal to $\pi$ at a wavelength of $\lambda_4$ for coupling the fourth signal between said second and sixth arms;

wherein $c_2$ and $c_3$ are the coupling coefficients of said second and third couplers, respectively, and are a function of wavelength, and $L_2$ and $L_3$ are the lengths of the second and third coupling regions, respectively.

5. The arrangement as defined in claim 4, wherein said dielectric strips and said substrate have coplanar surfaces.

6. The arrangement as defined in claim 4, wherein said waveguides are constructed for transmitting optical signals.

* * * * *